UNITED STATES PATENT OFFICE.

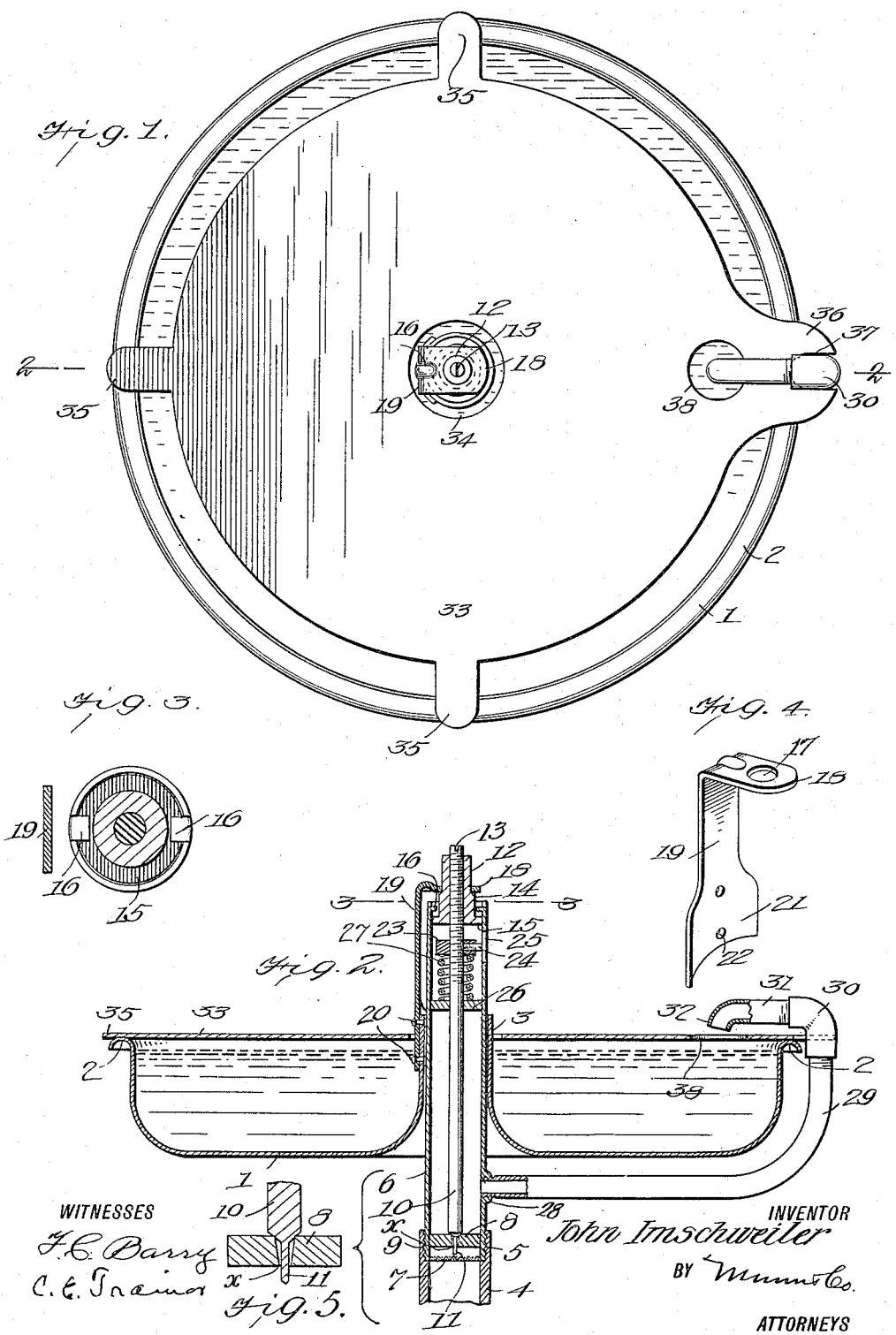

JOHN IMSCHWEILER, OF INGLEWOOD, CALIFORNIA.

DRINKING-FOUNTAIN.

1,160,511.  Specification of Letters Patent.  Patented Nov. 16, 1915.

Application filed June 19, 1913. Serial No. 774,604.

*To all whom it may concern:*

Be it known that I, JOHN IMSCHWEILER, a citizen of the United States, and a resident of Inglewood, in the county of Los Angeles and State of California, have invented a new and useful Improvement in Drinking-Fountains, of which the following is a specification.

My invention is an improvement in drinking-fountains, and has for its object to provide a fountain of the character specified, especially adapted for the use of poultry, wherein mechanism is provided for retaining water at a certain predetermined level within the tank, and for preventing access of animals other than poultry to the water.

In the drawings: Figure 1 is a top plan view of the improved fountain; Fig. 2 is a section on the line 2—2 of Fig. 1, Fig. 3 is a section on the line 3—3 of Fig. 2, Fig. 4 is a perspective view of the bracket for supporting the valve, and Fig. 5 is an enlarged detail of the lower end of the valve and its seat.

The present embodiment of the invention comprises an annular container, trough-shaped in cross section and open at the top, the said container 1 having an annular upwardly arched marginal flange 2, and the center wall 3 of the container is extended above the flange, as shown in Fig. 2. A supply pipe 4 is arranged at the axis of the container below the same, the upper end of the said pipe being internally threaded as indicated at 5, and a pipe 6 has its lower end threaded into the said threaded upper end of the pipe 4, and the said lower end of the pipe 6 is provided with a transverse screen 7 of perforate material. The pipe 6 is also provided with a diaphragm 8, just above the screen, and the said diaphragm has a central opening forming a port $x$ for the water and a valve seat for engagement by the lower conical end 9 of a needle valve 10. The needle valve 10 is mounted at the axis of the pipe 6, and the conical lower end engages the seat or port to close the same. The said pipe is also provided with a reduced extension 11 below the conical portion, for preventing disengagement of the valve when it is lifted out of contact with the seat.

A nut 12 is threaded on to the upper end of the needle valve and the said upper end is provided with a transverse kerf 13 for engagement by a screw driver or the like to turn the valve. The nut 12 is provided with an annular upwardly facing shoulder 14 intermediate its ends, and with an annular rib or flange 15 at its lower end, the said rib fitting the pipe 6. The upper end of the pipe 6 is provided with oppositely arranged pairs of longitudinal slits and the material between the slits is bent radially inward to form lugs 16 diametrically opposite each other for engaging above the rib or flange 15 to limit the upward movement of the nut 12 and to prevent disengagement of the said nut from the pipe. The upper end of the nut also passes through an opening 17 in the angular arm 18 of a bracket 19, which is secured to the central wall 3 of the container, by means of rivets 20, or the like. The said lower end of the bracket is enlarged annularly as shown at 21, and the openings 22 for the rivets 20 are in vertical alinement as shown, and the enlarged portion 21 of the bracket is arched transversely to fit the arch of the central wall 3.

The under face of the angular portion 18 of the bracket fits against the shoulder 14 of the nut and prevents upward movement of the said nut. A collar 23 is threaded on to the needle valve below the nut, and a set screw 24 is threaded through the collar into engagement with the needle valve to hold the collar in adjusted position.

The pipe 6 is provided with an opening 25 at the said set screw to permit access thereto to adjust the collar. The pipe 6 is also provided with a diaphragm 26, just above the upper end of the central wall 3 of the container, and the said diaphragm is fixed within the pipe and has a central opening to permit the passage of the needle valve.

A coil spring 27 encircles the valve between the collar 23 and the diaphragm 26, and acts normally to press the needle valve upward. The pipe 6 is provided with a lateral internally threaded nipple 28, just below the container and one end of a curved pipe 29 threaded into the said nipple. The said curved pipe 29 extends radially of the container beneath the same to the periphery thereof and then curves upward as shown, to near the flange 2 of the container. One end of an elbow 30 is threaded on to the said upper end and the other end of the elbow is engaged by a discharge pipe 31, having a curved outlet 32 delivering to the container. A cover in the form of a disk 33 of metal or the like suitable material is arranged above the container. The disk is of less diameter than the aggregate diameter of the container, that is, the distance from one side edge straight across to the other side edge, and the said cover has a central opening 34 for the central wall 3 of the container, and at its periphery the disk is provided with radially extending lugs 35 and 36, the said lugs being spaced at angular intervals of 90° and extending across the flange 2 of the container and resting upon the said flange to support the cover.

The lugs 35 are similar, while the lug 36 is of near about the same length as the lugs 35, but of greater width as shown in Fig. 1. The said lug 36 is at the pipe 29 and the said lug is slotted as shown at 37 to permit the passage of the elbow 30 above the cover. The cover is provided with a circular opening 38 at the discharge outlet 32 of the pipe 31, and the cover is removable to permit access to the container for purposes of cleaning or repairing. It will be noticed that the lateral nipple 20 is above the diaphragm 8 so that the needle valve 10 controls the supply to the said pipe. The container 1 is also removable from the pipe 6, and it may be lifted upwardly off the pipe 6, the bracket 18—19 moving therewith. The container may be of any suitable material as for instance, galvanized iron, and may be of any desired shape, the annular form being shown as a convenient form. The screen 7 is of wire gauze or the like, and the diaphragms 8 and 26 are preferably of brass, the diaphragm 8 having a conical opening as shown and being the valve seat, while the diaphragm 26 has a cylindrical opening and is a guide for the valve. The diameter of the opening of the diaphragm 26 is slightly greater than the diameter of the valve, so that the valve may move freely in the said diaphragm or guide. The said diaphragm however, prevents the passage of water through the upper end of the pipe 6, and is sufficiently tight for this purpose.

The spring 27 is the regulating means for regulating the depth of the water in the container. The collar 23 is also preferably of brass and by adjusting the collar on the valve, the tension of the spring 27 and as a consequence the depth of the water in the regulator, may be regulated. It will be noted that the entire weight of the container is supported directly by the spring 27, and as soon as the nipple of the container and connected parts and the water within exceeds the resistance of the spring 27, the needle valve will move downward, and will engage its seat to cut off the supply of water to the container.

The tension of the spring may be adjusted in accordance with the depth of water desired, and any one can make the adjustment. No particular skill is required, and the device may be arranged to provide for a water level adjacent to the flange 2 or for any depth that may be desired. Whenever the water attains this depth, the weight of the container, its connections and the water will overcome the resistance of the spring 27 and will compress the said spring and will close the opening through the diaphragm 8, thus shutting off the water from the container. When a portion of the water has been removed, the container will be lifted by the spring, thus lifting the needle valve and permitting the water again to flow. The cover 33 may be removed to clean the container, and the said cover prevents the entrance of impurities into the water and also prevents the poultry or other animals from fouling the water, by getting their feet in the same. The free edge of the cover is spaced apart from the outer wall of the container a sufficient distance to permit access to the water in the container.

It will be noted from an inspection of Figs. 2 and 5, that the opening or port "$x$" through the diaphragm 8 is frusto-conical or tapering, the said opening increasing gradually in diameter from the under face of the diaphragm to the upper face. At the lower end of the said opening, that is at the under face of the diaphragm the reduced point of the needle valve does not contact with the walls of the openings, there being an annular space between the peripheral surface of the said reduced point and the side wall of the opening. When the needle valve lifts, it never moves upward far enough to disengage the reduced point from the opening, so that the said opening is of the same size at all times. In other words the water from the supply pipe will fill the opening or port $x$ even when the needle valve is closed, as shown in Fig. 5, and as soon as the valve is lifted the water may flow into the pipe 6.

I claim:—

1. A drinking fountain comprising in combination with the vertical supply pipe having a lateral outlet and a valve seat below the outlet, said seat having a central conical opening, a needle valve in the pipe and extending above the same at the upper end of the valve, the lower end of the valve being conical for coöperating with the seat, a guide for the needle valve secured in the pipe above the seat, a collar adjustable on the valve above the guide, a spring between the collar and the guide, a nut threaded on to the upper end of the valve and extending above the pipe, said nut having an annular upwardly extending shoulder intermediate its ends and having an annular flange at its lower end within the pipe, said pipe having oppositely arranged inwardly extending lugs above the flange, a bracket having an angular upper end provided with an opening through which the upper end of the nut extends, said angular end engaging the shoulder of the nut, a container secured to the bracket, a delivery pipe connected with the lateral outlet and delivering to the container, said container being of annular form and encircling the supply pipe, and a cover of less diameter than the aggregate diameter of the container, the cover having a central opening for the supply pipe and an eccentric opening for the delivery pipe, and having radial lugs for engaging the upper end of the container to support the cover, said container having a flange at its upper end.

2. A drinking fountain comprising in combination with the vertical supply pipe having a lateral outlet and a valve seat below the outlet, of a container of annular form encircling the supply pipe and mounted for vertical sliding movement thereon, a needle valve for coöperating with the seat to control the flow of water through the lateral outlet, said outlet delivering above the container, a nut threaded on to the upper end of the needle valve and having an annular upwardly facing shoulder, a bracket arm connected with the container and having an opening for receiving the nut above the shoulder and resting on the shoulder to support the container, and a spring normally pressing the needle valve upward, the nut and the supply pipe having interengaging means for limiting the upward movement of the nut.

3. A drinking fountain comprising in combination with the vertical supply pipe having a lateral outlet and a valve seat below the outlet, of a container of annular form encircling the supply pipe and mounted for vertical sliding movement thereon, a needle valve for coöperating with the seat to control the flow of water through the lateral outlet, said outlet delivering above the container, a nut threaded on to the upper end of the needle valve and having an annular upwardly facing shoulder, a bracket arm connected with the container and having an opening for receiving the nut above the shoulder and resting on the shoulder to support the container, and a spring normally pressing the needle valve upward.

JOHN IMSCHWEILER.

Witnesses:
C. H. BROWN,
A. H. ROBBINS.

Copies of this patent may be obtained for five cents each, by addressing the "Commissioner of Patents, Washington, D. C."